United States Patent

[11] 3,617,715

[72] Inventor Ernst H. Dummermuth
 East Cleveland, Ohio
[21] Appl. No. 34,206
[22] Filed May 4, 1970
[45] Patented Nov. 2, 1971
[73] Assignee Allen-Bradley Company
 Milwaukee, Wis.

[54] AUTOMATIC ACCELERATION/DECELERATION FOR A NUMERICAL CONTROLLED MACHINE TOOL
 13 Claims, 11 Drawing Figs.

[52] U.S. Cl.................................................235/151.11,
 318/571, 235/92 F
[51] Int. Cl................................................. G06f 7/38,
 G05b 19/18

[50] Field of Search..........................................235/151.11;
 318/603, 591

[56] References Cited
 UNITED STATES PATENTS

| | | | |
|---|---|---|---|
| 3,110,865 | 11/1963 | Scuitto.......................... | 328/71 |
| 3,204,132 | 8/1965 | Benaglio et al. ............... | 307/149 |
| 3,344,260 | 10/1967 | Lukens.......................... | 235/151.11 |
| 3,530,283 | 9/1970 | McDaniel..................... | 318/571 X |
| 3,557,350 | 1/1971 | Proctor ........................ | 235/151.11 |

Primary Examiner—Eugene G. Botz
Attorneys—Arnold T. Ericsen and Richard C. Steinmetz ABSTRACT: A system is provided in a numerically controlled machine tool for maintaining constant its acceleration up to a desired velocity and its deceleration at a proper time from said velocity.

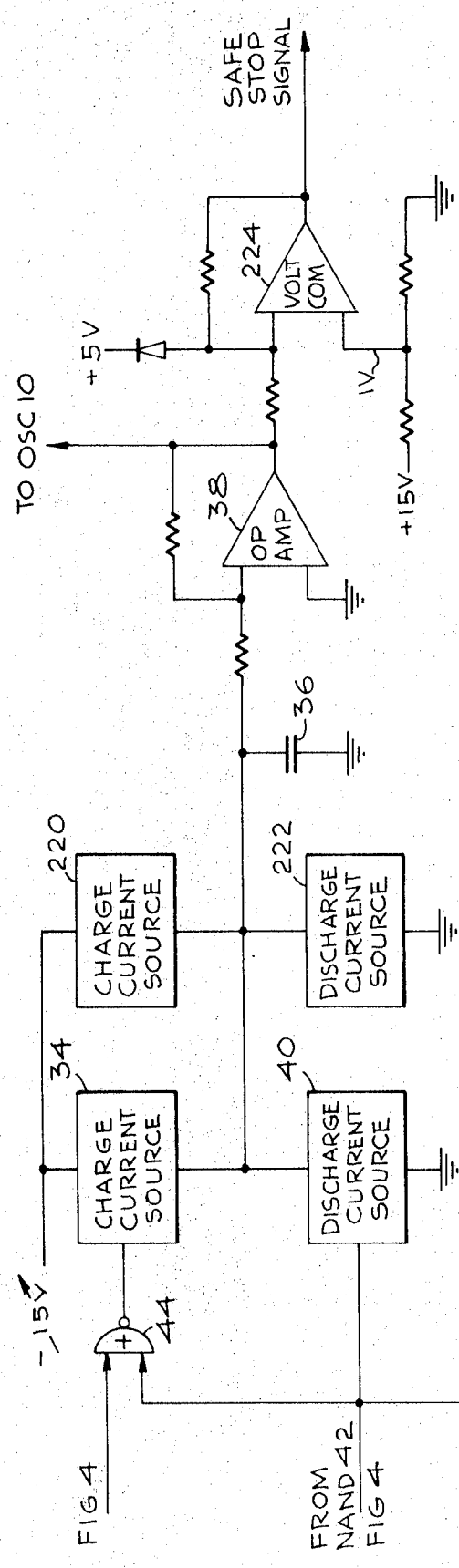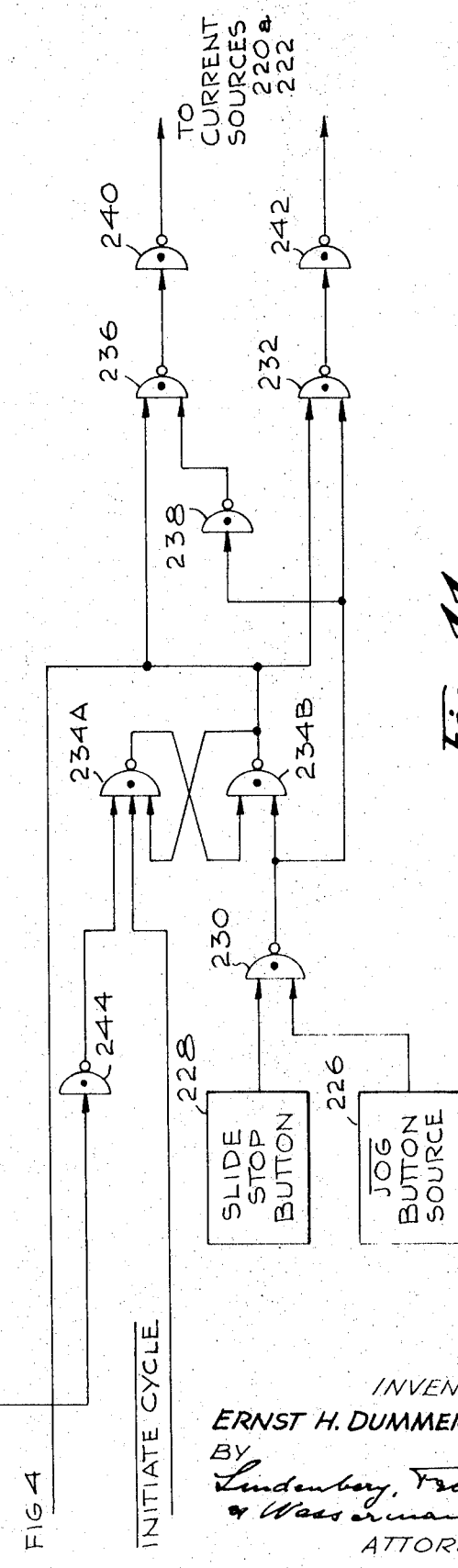
Fig. 11

AUTOMATIC ACCELERATION/DECELERATION FOR A NUMERICAL CONTROLLED MACHINE TOOL

BACKGROUND OF THE INVENTION

This invention relates to numerical machine tool control systems and, more particularly, to a system for automatically controlling the proper acceleration and deceleration of a numerically controlled machine tool.

In a numerically controlled machine tool, which performs contouring, for example, movement from one point to another is normally specified by three orthogonal components, X, Y, and Z. When these components are applied to a three axis contour generator then the velocity of each axis is proportional to the magnitude of its respective component and the input frequency to the contour generator.

The contour generator may be composed of a three axis rate multiplier or of three digital differential integrators. In either case, a predetermined number of input pulses has to be applied to the contour generator to meter X, Y, and Z pulses into the corresponding axis servos. Since, in these numerically controlled systems, mechanical parts are driven, problems of mass acceleration and mass deceleration arises.

Acceleration or deceleration is conventionally achieved by dividing a move of the system into several intervals and assigning different velocities to each interval.

OBJECTS AND SUMMARY OF THE INVENTION

A feature of this invention is to provide a numerical control system wherein acceleration or deceleration can be achieved without dividing a move into several intervals.

Another object of this invention is to provide apparatus wherein the acceleration or deceleration constant may be selected to the requirements of a particular machine.

Yet another feature of this invention is the provision of an arrangement for selecting three different acceleration or deceleration constants to optimize the three axis system.

Still another object of this invention is the provision of a novel, improved arrangement for controlling acceleration and deceleration in a numerical control system suitable for both linear as well as circular interpolation.

These and other features of the invention are achieved in a numerical control system wherein the frequency of the oscillations applied to a feedrate generator, and therefore, the output frequency of the feedrate generator is varied to maintain the acceleration and/or deceleration of the numerical control system at a constant value over predetermined distances of a path of travel. An iteration counter, which determines the number of iterations which must be performed by a given digital differential integrator apparatus, used for generating the command pulse trains for an axis, by its count as well as by its complementary count, respectively, can provide an indication of how many iterations have been completed and how many have to be completed for a given path. The frequency at which this counter is driven provides an indication of how many iterations will be executed per interval of time. From a knowledge of the frequency and count one can derive the elapsed time as well as the time to complete a given path.

The control pulse train for an axis is directed through a circuit which provides an analog voltage whose amplitude represents the frequency of those pulses in the command pulse train. The voltage is converted to a representative pulse width. The representative pulse width is converted to a count by enabling a NAND gate which permits pulses from the feedrate generator to be counted by a velocity counter during the interval of said last named pulse width.

The velocity counter count is normalized with respect to the iteration counter count and then is compared with the count of the iteration counter. If the count in the velocity counter is less than the count in the iteration counter then the frequency of the pulses applied to the feedrate generator is increased. If the velocity counter count exceeds that of the iteration counter, then the frequency of the pulses fed to the feedrate generator is decreased. An increase in the frequency of the output of the feedrate generator increases the velocity of operation of the machine tool, while a decrease does the reverse. In this manner, by comparing the count in the velocity counter with the count in the iteration counter, at the beginning of a path, and with the complementary count of the iteration counter before reaching the end of the path, and controlling the pulses fed to the feedrate generator accordingly, maintenance of constant acceleration and constant deceleration will be achieved over these critical portions of the path of motion.

The novel features of the invention are set forth with particularity in the appended claims. The invention will be best understood from the following description when read in conjunction with the accompanying drawings.

BRIEF DESCRIPTION OF THE DRAWINGS

FIG. 11 is a block schematic diagram of the circuitry required for performing slide stop and jog acceleration and deceleration in the disclosed system.

DESCRIPTION OF THE PREFERRED EMBODIMENTS

The well known equation which relates acceleration and deceleration to velocity and time is, $$v=a \cdot t \quad (1)$$

where $v$ is the momentary velocity in inches per second, $a$ represents a constant acceleration or deceleration term in inches per second squared, and $t$ is the time in seconds. From this equation it will be understood that the velocity changes proportionally with respect to time when the acceleration is maintained constant.

To provide a selected constant deceleration for an axis motion, it is necessary to know the velocity of that axis. In addition, some look-ahead logic must be provided which is capable of calculating backwards a time $t$ from the anticipated end point of a path from which it is desired to reduce the velocity at the selected constant deceleration.

In an application for NUMERICAL CONTROL CONTOURING SYSTEM by this inventor, Ser. No. 841,846, filed July 15, 1969, digital differential integrators, known as DDI's, are used as the rate multipliers, and along with these an iteration counter is employed which indicates the number of iterations of the DDI's required to convert a motion command number into a command pulse train. The total number of iterations is fixed by the size of the DDI registers. The frequency of the iteration is determined by the output of the feedrate generator which supplies pulse trains to drive the iteration counter as well as the DDI's. This iteration frequency provides an indication of how many iterations will be executed per unit of time. Accordingly, the time $t$ of equation (1) may be computed as, $$t = \Delta i / f \quad (2)$$

where $\Delta i$ is the number of iterations to be completed and $f$ is the feedrate.

Equation (2) may now be substituted into equation (1) to provide, $$v/a \cdot f = \Delta i \quad (3)$$

When deceleration is considered, the complement of the number in the iteration counter may be employed. Thus, for deceleration, the iteration counter looks like a down counter and therefore equation (3) is still true. It will be understood that $\Delta i$ is available, $f$ is also available as the output of the feed generator, and $v$ is available by converting each axis command pulse train into a voltage whose amplitude is determined by the frequency of the command pulse train. The circuit for providing this conversion is a low pass filter circuit commonly known as an F/E circuit. The term $1/a$ is the gain setting of the axis F/E circuit.

With all variables available, a closed loop circuit may be constructed, in accordance with this invention, to maintain the equality of equation (3), whereby $a$ is thus maintained constant.

Figure 1:
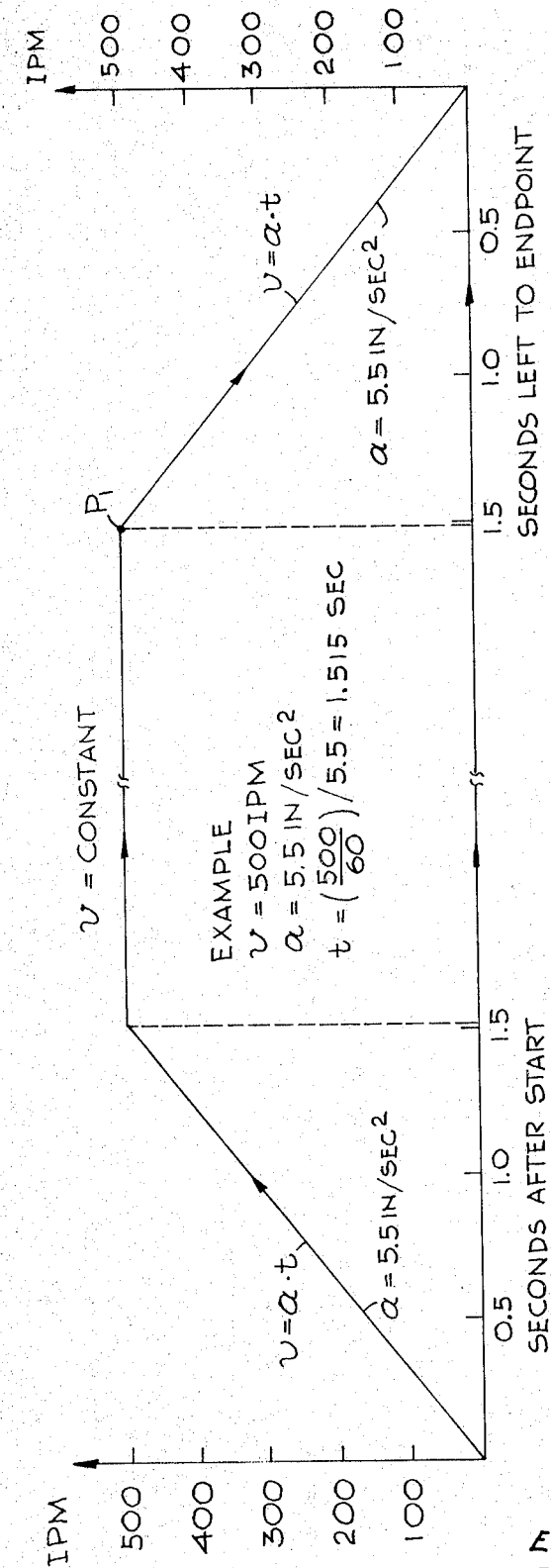
FIG. 1 is a graphical representation of the equation: $v=at$, where $v$ is velocity, $a$ is acceleration, and $t$ is time.

FIG. 1 is a graphical presentation of equation (1) illustrating a system in which a desired maximum velocity of 500 inches per minute (i.e. 500/60 inches per second) is to be attained at a constant acceleration of 5.5 inches per second squared, with a like deceleration occurring from the maximum velocity down to 0 velocity. The time required for acceleration and for deceleration is readily calculated as shown in FIG. 1 to give a value of $t=1.515$ seconds.

Figure 2:
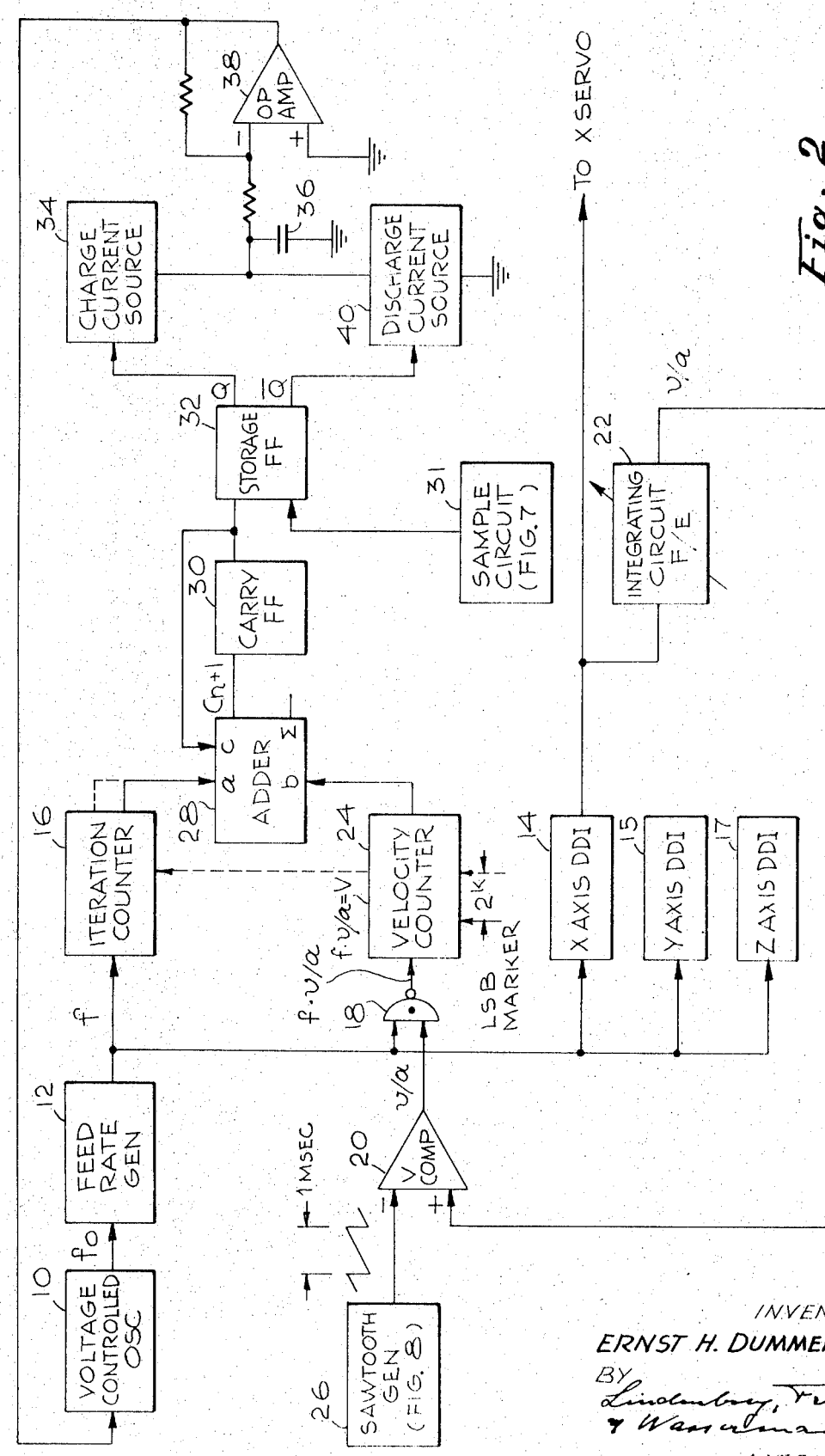
FIG. 2 is a block schematic diagram of an embodiment of the invention shown for one axis.

FIG. 2 is a block schematic diagram illustrating an embodiment of the invention whereby acceleration and deceleration may be maintained constant. The drawing illustrates the operation of the invention for a single axis numerical control machine tool; however, its extension to more than one axis will be shown and will be made clear subsequently herein. Also, only so much of the well known structure of a numerically controlled machine tool is shown as is required to orient one to the location of the additional structure of this invention within that framework and to thereby permit one skilled in the art to readily practice the features of the invention and obtain the advantages thereof.

Referring now to FIG. 2, a voltage controlled oscillator 10 applies its output oscillations to a feedrate generator 12. The feedrate generator produces a pulse train whose frequency is determined by a feedrate number read from the input data source as well as by the oscillator frequency. Feedrate generator structure is well known; however, a unique arrangement thereof is shown and described in the previously mentioned application by this inventor. The output of the feedrate generator, which is a pulse train at a predetermined frequency, is applied to the axis DDI 14, which, by way of example, may be the X axis DDI. Y and Z axis DDI's, 15 and 17, are also shown to illustrate how they are connected into this circuit. The feedrate generator output is also applied to an iteration counter 16. This counter counts the number of iterations required to be performed by the axis DDI's in order for them to generate the required number of pulses for a command pulse train. The number of iterations that all of the axis DDI's go through is the same. However, the number of command pulses in a command pulse train that they generate is determined by the command number entered into the DDI integrand register for each axis.

As illustrated in FIG. 2, the output of the feedrate generator 12 is also applied to a NAND-gate 18. The other input to the NAND-gate 18 is from a voltage comparator circuit 20. The output of the NAND-gate 18 is applied to a velocity counter 24.

The voltage comparator 20 is used to convert the amplitude of an analog voltage into a pulse width. The analog voltage is provided by a low pass filter circuit 22, designated by F/E, which averages the command pulse train output of the axis DDI 14, providing a voltage whose amplitude is proportional to $v$. The gain setting of this circuit is inversely proportional to the desired acceleration and thus the output of the circuit is a voltage representative of the quantity $v/a$.

Figure 8:
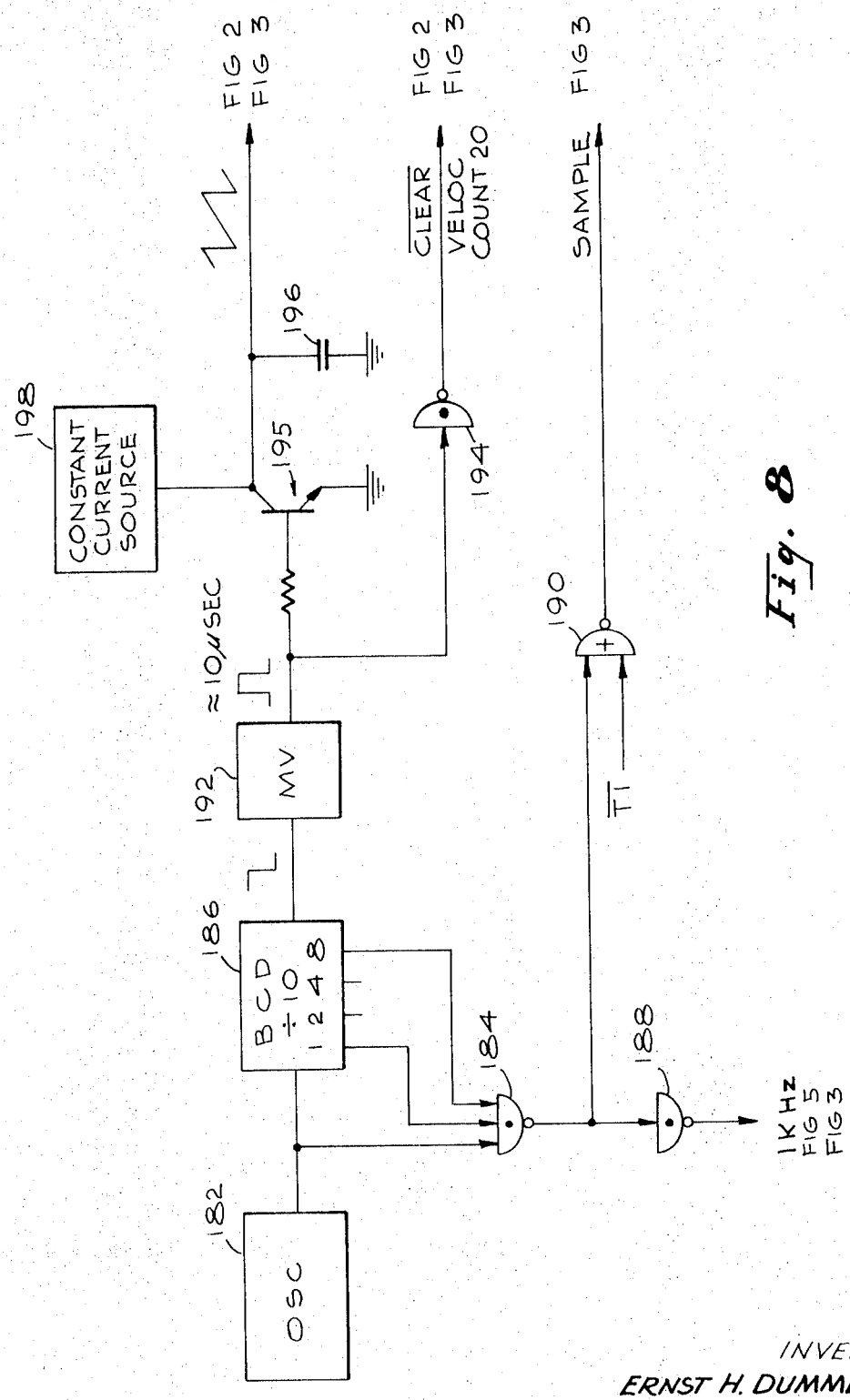
FIG. 8 is a block schematic diagram illustrative of the clock signals and sawtooth generator used in the invention.

The voltage comparator 20 compared its two input voltages and its output enables NAND-gate 18 to apply feedrate generator pulses to the velocity counter 24 for as long as the amplitude of the voltage from F/E circuit 22 exceeds a 1 kilohertz sawtooth voltage provided by a sawtooth generator 26; the circuit for each is shown in FIG. 8. Thus, the pulse width of the output of the voltage comparator 20 represents the amplitude of the output of the F/E circuit, and therefore still represents the quantity $v/a$.

It should be apparent from the foregoing that the number of pulses which are passed through NAND-gate 18 depend upon the pulse width from the voltage comparator 20 the upon the frequency of the feedrate generator pulses, and therefore represents the product of $v/a \cdot f$. Therefore, the count in the velocity counter 24 is proportional to the left-hand side of equation (3). The count in the counter 24 caused by the pulses passed thereto during a single pulse width is considered as one sample. At the end of the sample, the count of the counter 24 is processed in a manner to be described and then compared with the count of the iteration counter 16. In view of equation (3), deceleration must start if the content of the counter 24 equals or exceeds the content of the iteration counter 16.

Figure 4:
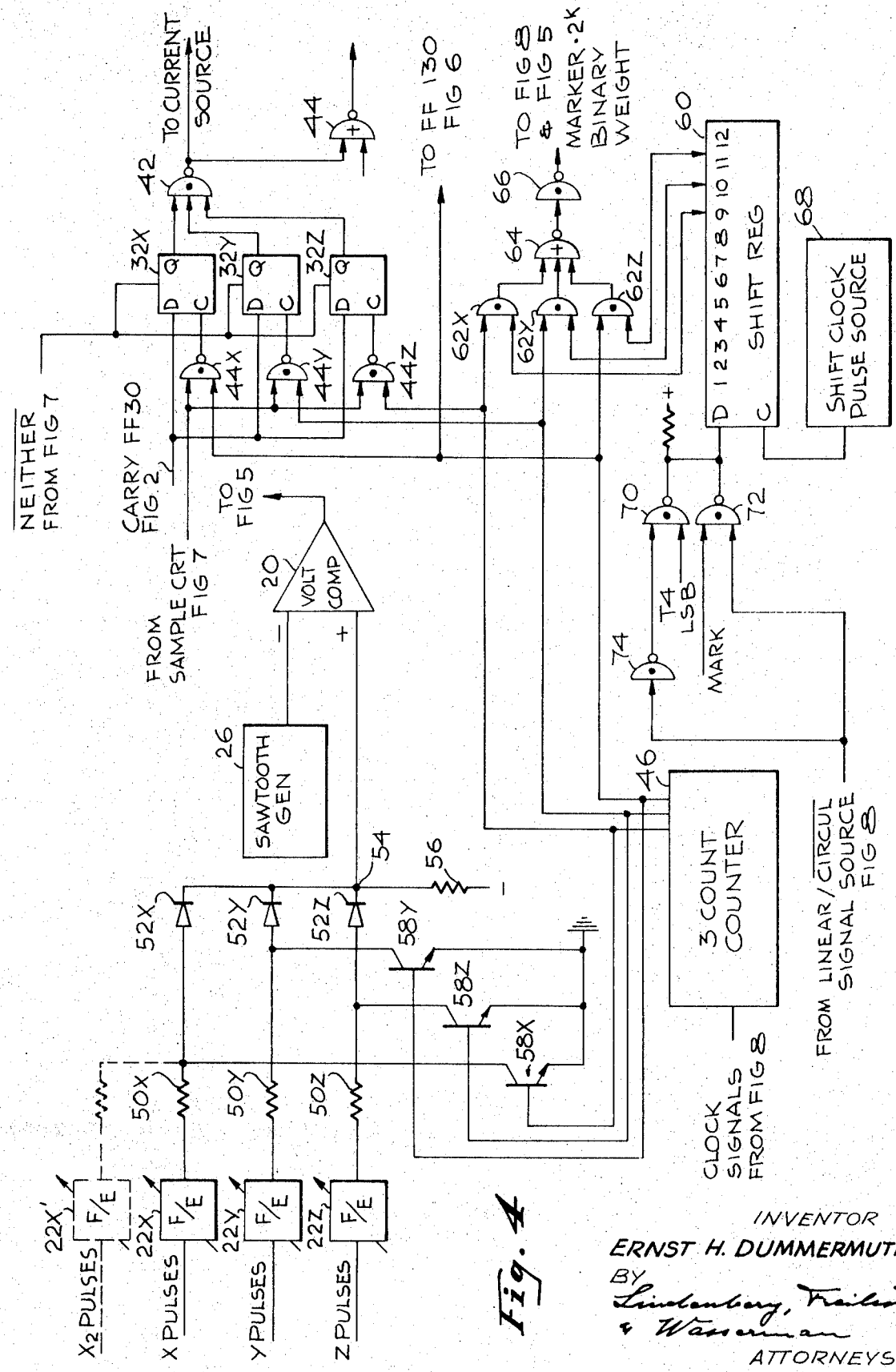
FIG. 4 is a block schematic diagram showing the implementation required of FIG. 2 to enable it to be operable for a multiple axis system.

Since the counter 24 has only received a single 1 millisecond sample (because the sawtooth frequency is 1 kilohertz so that each output pulse of the voltage comparator occurs within 1 millisecond), the contents of the velocity counter 24 must be scaled upwards or scaled with respect to the count of counter 16 to make the comparison meaningful. Assuming a maximum feedrate generator frequency of 166 kilohertz, the velocity counter reaches a maximum count of 166 during 1 millisecond. This number scaled upward by, for example, $2^8$, yields a number $166 \cdot 2^8$ or 42,496. Powers of two are natural scaling factors for serial binary arithmetic. The scaling factor determines when deceleration starts and thus the value of $a$. A marker, indicating the least significant bit (LSB) of the iteration counter 16 is delayed, by means of a shift register 60, in a manner as shown in FIG. 4. This marker is then applied to the counter 24 to scale it properly upwards. When the velocity counter 24 count is 42,496, deceleration must start if the iteration counter count is 42,496 or less.

On the assumption that the present machine tool maximum velocity equals 200 inches per minute and the time for deceleration is at hand, the deceleration constant $a$ may be determined for the example given using equation (3) for which $v$ is 200 inches per minute, $f$ is 166 kilohertz, $\Delta i$ is 42,496, and $a=13$ inches per second squared.

By choosing a scaling factor of $2^9$, deceleration would start at a count of $166 \cdot 2^9$ or 84,992. The deceleration constant then would equal 6.5 inches per second squared. By choosing a scaling factor of $2^{10}$, the deceleration constant would equal 3.25 inches per second squared.

It should be noted from FIG. 2 that both the velocity counter 24 and the iteration counter 16 have the $f$ feed pulses applied thereto. Thus, the deceleration constant $a$ is independent of $f$, since $f$ drops out of equation (3) so that $a$ is a function of only the velocity $v$ and the scaling factor $2^k$.

To obtain deceleration constants between the mentioned values, the gain of the F/E circuit 22 may be adjusted. As a result, any desired deceleration constant $a$ can be selected by choosing a scaling factor for the counters 16 and 24 and also a gain setting for the F/E circuit.

Figure 3:
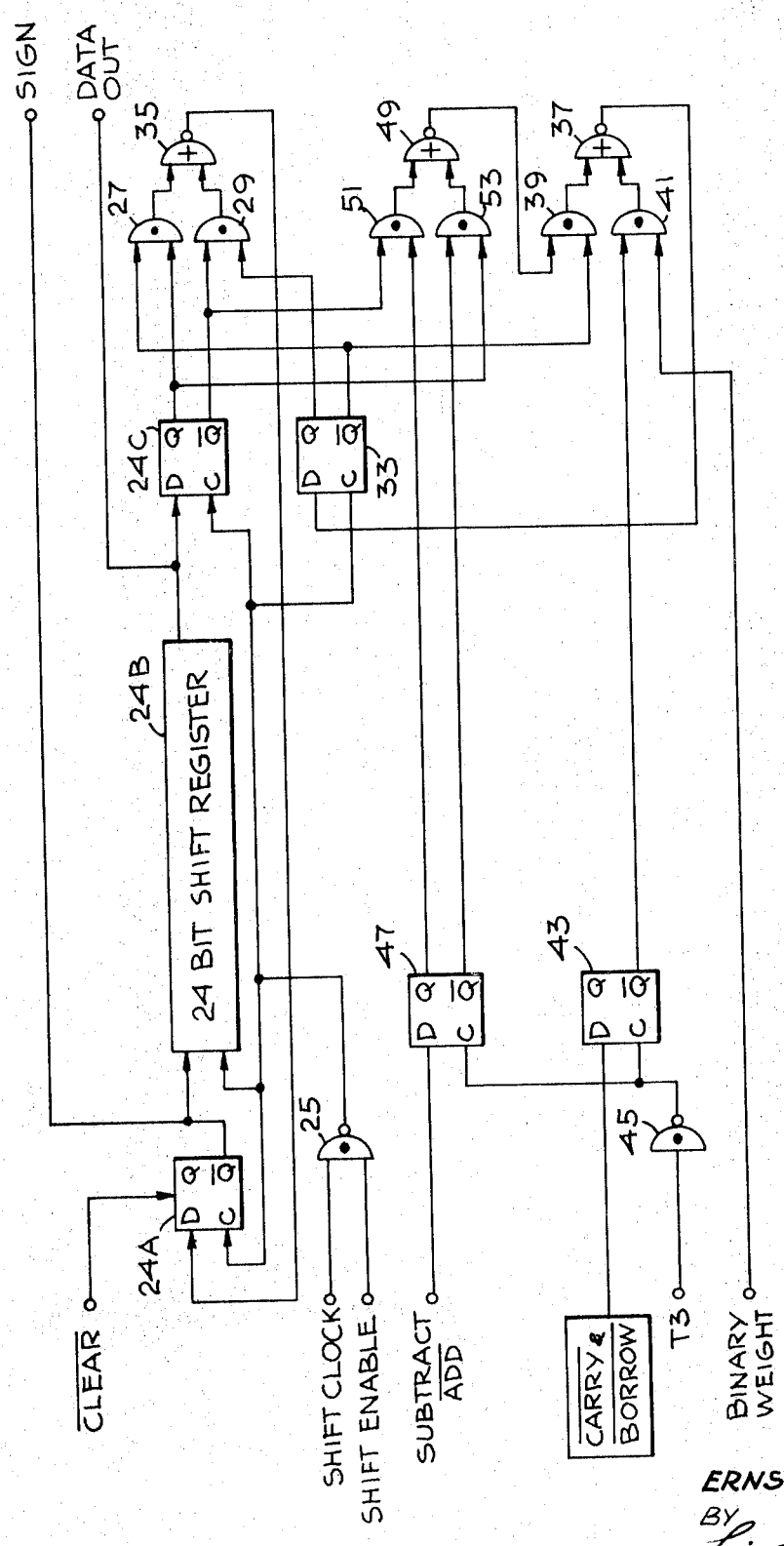
FIG. 3 is a block schematic diagram of a counter suitable for use in the embodiment of the invention.

FIG. 3 illustrates a counter arrangement which may be used for the iteration counters 16 and/or the velocity counter 24 in FIG. 2, or employed within any of the axis DDI's.

Effectively, the counter comprises a 25 bit shift register and its associated logic. The shift register has a most significant bit flip-flop stage 24A, and the remaining 24 stages are designated by the rectangle 24B. The contents of the shift register are shifted from the least significant bit stage through a delay flip-flop 24C, and other logic, around to the most significant bit stage 24A. The shifting is done when shift clock pulses are applied to a NAND-gate 25, which is enabled by a shift enable signal.

The Q output of the least significant bit stage of the shift register is applied to the D input of the delay flip-flop 24C and is entered upon the occurrence of the shift clock. If the input is a 1 the Q output of flip-flop 24C is high, if it is a 0 then the $\overline{Q}$ is high. Data output is also taken from the least significant bit end of the shift register. The Q output of flip-flop 24C is applied to a AND-gate 27, the $\overline{Q}$ output of the flip-flop 24C is applied to a AND-gate 29. A flip-flop 33 enables AND-gate 27 with its $\overline{Q}$ output and AND-gate 29 with its Q output. The outputs of AND-gates 27 and 29 are applied to a NOR-gate 35, the output from which is fed back to the first shift register stage 24A.

Flip-flop 33 receives clock pulses from the shift clock source. Flip-flop 33 is set in response to the output from a NOR-gate 37. NOR-gate 37 receives outputs from either a AND-gate 39, or a AND gate 41. One input to an AND-gate 41 is a timing signal assigning a BINARY WEIGHT to the counter. Another input to AND-gate 41 is a $\overline{Q}$ output of a flip-flop 43. Flip-flop 43 functions to either increment or decrement the register in response to a signal from a source designated as $\overline{carry}$ or $\overline{borrow}$ which is applied to the D input terminal of the flip-flop 43. The setting or resetting of flip-flop 33 is determined by a timing signal designated as BINARY WEIGHT and the states of flip-flop 43 and AND-gate gate 39. The timing signal T3 inverted in NAND-gate 45 is applied to the clock terminal of flip-flop 43 and the clock terminal of another flip-flop 47 to set up the increment/decrement condition.

AND-gate 39 receives as one input the $\overline{Q}$ output of the flip-flop 33 and the other input is the output of a NOR-gate 49. The two inputs to NOR-gate 49 are the respective outputs of AND-gates 51 and 53. The Q output of flip-flop 47 is one input to AND-gate 51, the other input is the $\overline{Q}$ output of flip-flop 24C. The $\overline{Q}$ output of flip-flop 47 is one input of AND-gate 53, the other input is the Q output of flip-flop 24C.

Before explaining the operation of the counter, an understanding should be had of the binary arithmetic principles which are involved in its operation. When the shift register is operating in the ADD mode (flip-flop 47 with its $\overline{Q}$ output high), the binary number which is shifted from the least significant bit end of the register to the most significant bit end is not altered when a 0 is to be added. However, when a 1 is to be added, the binary bits being shifted are inverted, commencing with the binary bit at which the 1 is added until a 0 is detected after which inversion will no longer occur. Thus, if there is a binary number 110011, to which it is desired to add 1 at the least significant bit position, then the least significant bit coming out of the shift register will be circulated back to the head end of the shift register as a 0, the next bit will be a 0, the third bit will be a 1, and the remaining bits will be the same as they are. This same rule is applied no matter at which bit in the binary number a 1 is added.

Scaling may be performed by shifting the contents of the shift registers as many places to the left as indicated by the magnitude of the scaling desired. A preferred way of scaling is to add 1 to the number in the shift register at the location corresponding to the desired scaling factor. Thus, if the scaling factor is $2^8$, the 1 is added to the eight bit position of the number in the register. Thereafter the number in the register may be compared with the number in the other counter.

The register is cleared by resetting the most significant bit stage 24A to its 0 state and holding it reset for one full shift cycle.

The register circulates by applying its output to the flip-flop 24C whereupon its Q output is high in response to a 1 output from the register and its $\overline{Q}$ output is high in response to a zero output from the register. If AND-gate 27 is enabled, then the contents of the register are circulated without inversion through NOR-gate 35, back to the most significant bit stage 24A of the register. If it is desired to invert the contents of the register, then the $\overline{Q}$ output of flip-flop 24C is taken by enabling AND-gate 29, the output of which is circulated back to the head end of the register through the NOR-gate 35.

When it is desired to add 1 to the contents of the register, a 1 representative signal is applied to the D input of flip-flop 43 causing it to be reset. The timing signal BINARY WEIGHT indicates at what bit position the 1 is to be added.

This latter facility provides the preferred way for multiplying the number in the register by the scaling factor. It is done by simply adding the 1's into the register at the location corresponding to the scaling factor. Thus, if the scaling factor is $2^8$, then the incoming counts to the shift register are always added to the contents of the register at the eighth bit position. This may be understood by assuming that the contents of the register initially are 0. The register is then permitted to commence circulating. Upon the occurrence of the eighth clock pulse, the timing signal BINARY WEIGHT to AND-gate 41 is actuated enabling a 1 to be inserted at the eighth bit position.

When it is desired to add a 1 into the shift register, then flip-flops 47 and 43 have their $\overline{Q}$ outputs high. Upon the occurrence of the weighted timing signal, AND-gate 41 is enabled whereby its output is applied through NOR-gate gate 37 to the D input of flip-flop 33. The Q output of flip-flop 33 goes high whereupon AND-gate 29 is enabled to select and circulate the $\overline{Q}$ output of flip-flop 24C. If the next bit shifted into the flip-flop 24C is a 1, then AND-gate 53 is enabled. Its output enables AND-gate 39 which maintains flip-flop 33 with its Q output high whereby the inverted output of the shift register is again selected for circulation.

If the next bit out of the shift register is a 0, then the $\overline{Q}$ output of the flip-flop 24C is made high. This is circulated as a 1 into the head end of the shift register, however, flip-flop 33 is reset on the next clock pulse, since its D input is removed. This closes AND-gate 29. Thereafter, the shift register will circulate its contents uninverted.

When flip-flop 33 has its $\overline{Q}$ output high, then only the Q output of the flip-flop 24C is selected by AND-gate 27 whose output is circulated through NOR-gate 35 to the head end of the register.

From the foregoing description it should be clear how, both addition to the contents of the register is performed as well as scaling by addition at a specific bit location in the register.

For operating the shift register in the subtraction mode, a subtract signal is applied to the D input of the flip-flop 47, causing its Q output to go high. This enables AND-gate 51 to apply a signal through NOR-gate 49, through AND-gate 39 in the presence of a $\overline{Q}$ output of flip-flop 33, and through NOR-gate 37 to the D input of flip-flop 33 causing it to be set. The Q output of flip-flop 33 will then select for circulation the $\overline{Q}$ output of flip-flop 24C. Subtraction with the arrangement shown in FIG. 3 occurs in a reverse manner to addition. That is, if the bit position from which the subtraction occurs is a 1, it is inverted to a 0 and the higher order bits are not inverted. If the bit position from which the subtraction occurs is a 0, then if the next higher order bit is a 1, it is inverted and no further inversions are made to occur. However, if the succeeding bit positions are 0's, then they are inverted to 1's until the next 1 is sensed whereupon it is inverted to a 0. Thereafter, no further inversion occurs. This is carried out by the logic shown. Flip-flop 47 is maintained with its Q output high when in the subtraction mode. When a 1 is to be subtracted, as signalled by the $\overline{Q}$ output of the flip-flop 43 enabling AND-gate 41, flip-flop 33 is set and selects the inverted output of the shift register for circulation until such time as a 1 appears at the Q output of flip-flop 24C. This enables flip-flop 33 to reset with its $\overline{Q}$ output high whereupon the normal or uninverted output of the shift register is circulated.

Referring back to FIG. 2, the iteration counter 16 and the velocity counter 24 are serial binary shift registers. Comparison of their contents is done by adding the complement of one register to the content of the other and observing the carry overflow. This is accomplished by the adder 28 which is a single bit binary full adder and which has a carry flip-flop 30. After comparison is complete, the overflow is transferred into a storage flip-flop 32. Since the sawtooth repetition frequency, used, by way of example, is 1 kilohertz, every 1 millisecond the comparison is repeated and the storage flip-flop 32 is updated.

As long as the content of the iteration counter 16 is larger than the content of the scaled velocity counter 22, ($\Delta i > v$), the subtraction yields a positive number and a carry overflow is generated at flip-flop 30. Flip-flop 32 remains high and its Q output enables a charge current source 34, which is supplied current from a fixed negative potential, to charge a capacitor 36. The capacitor voltage cannot exceed the value of the fixed negative potential which, by way of example, is −15 volts.

The voltage across the capacitor 36 is applied to an operational inverting amplifier 38. This applies the capacitor voltage to the voltage controlled oscillator 10 to control its output frequency accordingly. Since the voltage controlled oscillator supplies the feedrate generator 12, the output frequency of the feedrate generator is the driving source for the comparison.

When approaching the end point of a path but not yet at the point P1 shown in FIG. 1, the velocity counter always counts to the same maximum number during a 1 millisecond interval and is then reset again, whereas the complement of the iteration counter count indicative of the number of iterations left to be carried out is steadily decreasing. At the moment where a sample indicates that $\Delta i \leq v$, the storage flip-flop 32 is reset, turning off the current source 34 and turning on a discharge current source 40. As a result, the voltage across the capacitor 36 decreases and the frequency of the voltage controlled oscillator and the feedrate frequency $f$ begins to reduce, following the drop in amplitude of the voltage across capacitor 36. The consequent reduction in the feedrate generator frequency, however, results in a lower axis pulse rate from the axis DDI 14, and also in a lower voltage at the axis F/E 22. Therefore both inputs to NAND-gate 18 are reduced and the velocity counter 24, with its next sample, monitors a lower velocity. However, $\Delta i$ is still approximately the same. Therefore the comparison of $\Delta i$ and $v$ for this sample yields $\Delta i$ is greater than $v$, and storage flip-flop 32 again sets thereby enabling current source 34 and disabling current source 40. As a result, $f$ increases, and the next sample indicates $\Delta i \geq v$ and deceleration starts again.

It should now be understood that this closed loop configuration actually balances around equality of the counts in the iteration counter 16 and the velocity counter 24, as a result of which equation (3) is maintained until $\Delta i$ reaches 0. The system adjusts itself along the proper slope. The duty cycle of deceleration versus acceleration determines the slope.

By way of review of the system described, initially, when starting a move from 0 velocity and where it is desired to accelerate to a maximum predetermined velocity with a constant acceleration, the system functions as described, comparing the true count of the iteration counter with the count of the velocity counter 24, increasing the voltage controlled oscillator frequency (up to a maximum preset value) whenever $\Delta i \geq v$, and decreasing the voltage controlled oscillator frequency (down to a minimum preset value), whenever $\Delta i < v$. When the predetermined desired constant velocity is attained by the system, the iteration counter count will continue increasing while the velocity counter count will remain at a constant value, which is less than the value of the iteration counter count. Since the capacitor 36 is at its maximum charge at this time, the machine tool will move with a constant predetermined velocity.

Now, when approaching the end point, a deceleration to 0 speed should be performed. The iteration counter 16 must count up during acceleration and must count down during deceleration. Since the iteration counter 16 always counts up, in order to use it for deceleration, after passing the 50 percent count point, the opposite or complement output of the counter will be used. When the point $P_1$ (FIG. 1) is reached, the iteration counter count should begin to be less than the velocity counter count whereupon the capacitor will be permitted to begin to discharge. The oscillator frequency will follow the discharging capacitor. The system will then commence to decelerate down to zero speed in the manner previously described.

It should be appreciated that the closed loop technique described herein can operate with any override potentiometer setting and any feedrate number programmed, since accel/decel is performed by comparing actual velocity with time, as described in equation (1).

AXIS MULTIPLEXER

FIG. 4 is a block schematic diagram of the circuitry required to implement that shown in FIG. 2 in order to enable it to function for a three or more axis system. In order to control the acceleration or deceleration of a multiaxis system, in accordance with this invention, a multiplexing circuit is provided. It has been shown that in the acceleration mode of operation, the frequency of the voltage controlled oscillator 10 should increase if $\Delta i \geq v$ for all axes. Therefore a storage device must be provided to hold this information over the interval required to collect it for all axes (for example, for a three axis machine, a collection interval is one millisecond per axis, this equals 3 millisecond maximum overall sample time). To accomplish this three storage flip-flops 32X, 32Y and 32Z, are provided. A NAND-gate 42 combines the Q outputs of the flip-flops. When all of these Q outputs are high, the output of the NAND-gate 42 is inverted by the NOR-gate 44 and enables the charge current source 34 to charge capacitor 36. Otherwise, the discharge current source 40 is enabled to discharge capacitor 36 by the high output of the NAND-gate 42.

Figure 6:
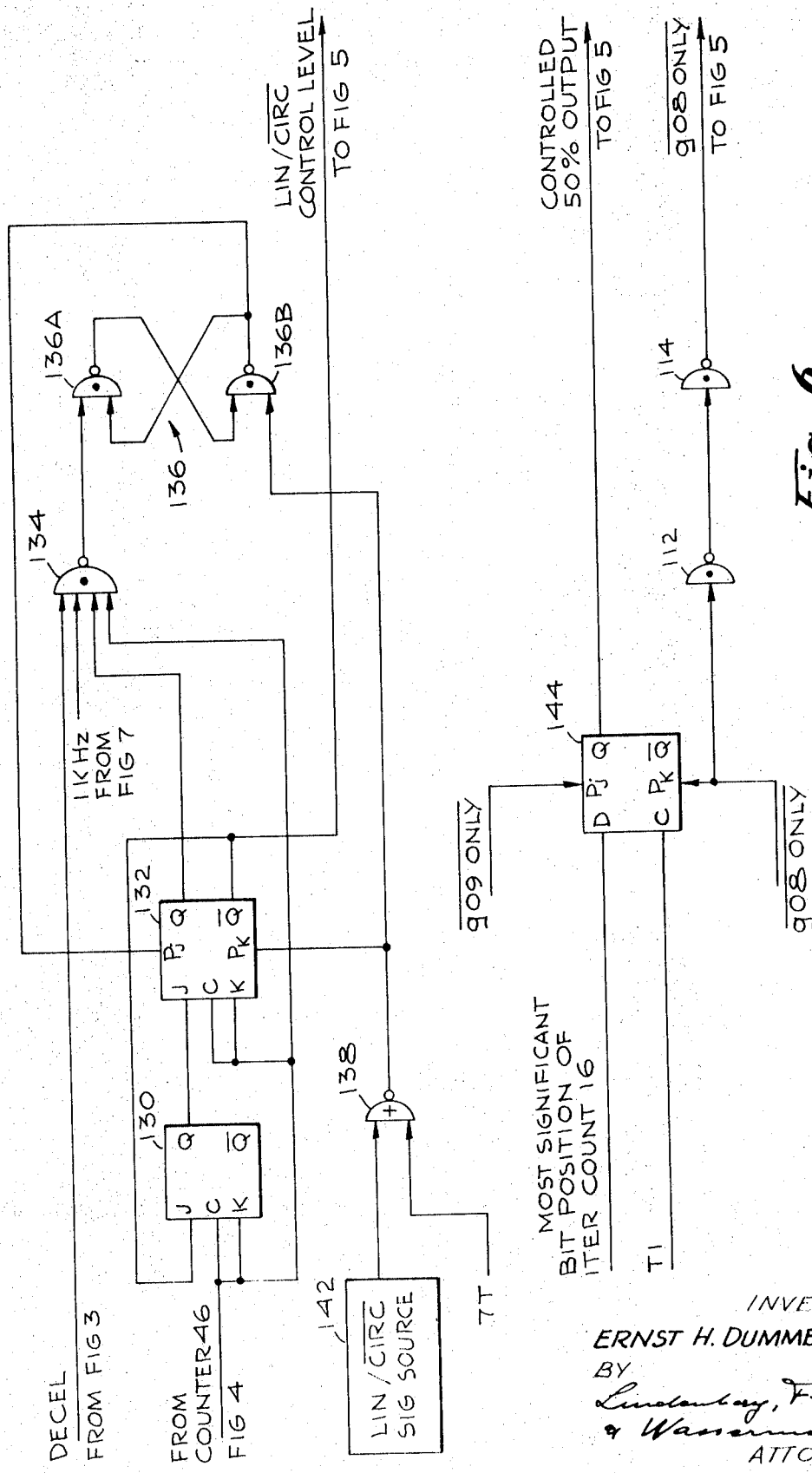
FIG. 6 is a block schematic diagram of control circuits used in the embodiment of the invention.
Figure 7:
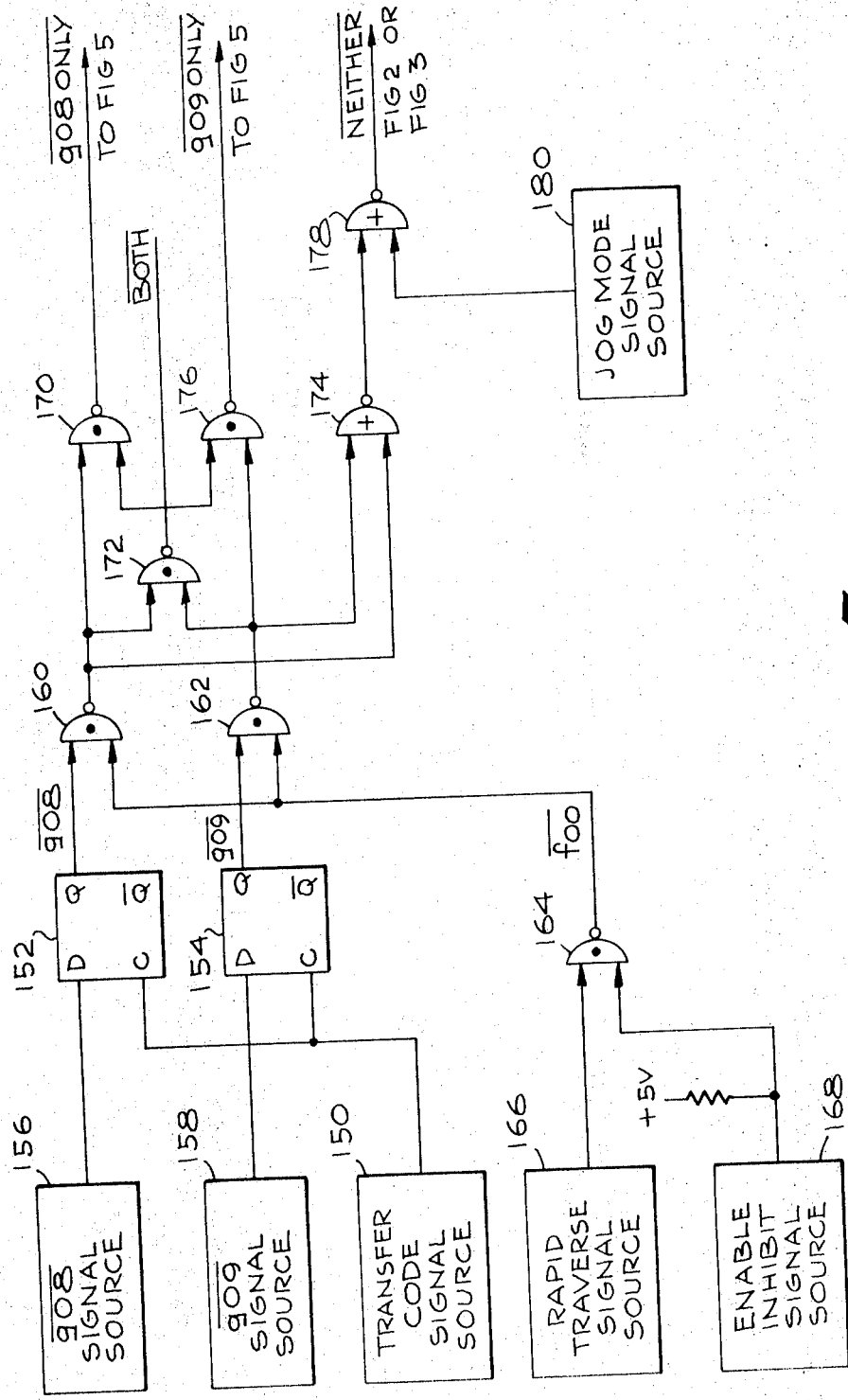
FIG. 7 shows the block schematic diagram of a circuit arrangement which may be employed for the separation of acceleration and deceleration codes, used with the invention.

The logic for operating the three flip-flops 32X, 32Y and 32Z includes three NAND gates respectively 44X, 44Y, and 44Z, which are driven in response to the outputs of a three count counter as well as a sample signal from a sampling circuit shown in FIG. 7. For reasons which will appear when FIG. 6 is described, the three flip-flops are held with the Q outputs high by the output of a "neither" circuit, shown in FIG. 6. The output of the carry flip-flop 30 is simultaneously applied to all of the D inputs of the three flip-flops 32X, 32Y and 32Z. However, the entry from carry flip-flop 30 into each flip-flop is determined by the output of the respective NAND-gate 44X, 44Y and 44Z. The inputs to these comprise the output of a sample circuit shown in FIG. 7 together with the three outputs of the three count counter comprised of the two flip-flops respectively 46 and 48. The three count counter is driven by clock signals at a frequency of 1 kilohertz, which are derived from the clock circuit shown in FIG. 8.

There is an F/E circuit respectively 22X, 22Y and 22Z, for each axis, each with the facility for adjusting its gain separately. If there is a fourth axis, then its output may be OR'ed with the output of whichever one of the three axes has the same K or gain factor. For example, there is shown in dotted lines an F/E circuit 22X', exemplary of another axis which has the same K factor as the X axis and therefore is OR'ed with the output of the F/E circuit 22X.

The output of the respective F/E circuits, 22X, 22Y and 22Z, are respectively connected through three resistors respectively 50X, 50Y, and 50Z, and through the respective diodes 52X, 52Y, and 52Z, to a common junction 54. This junction is connected to one of the two inputs of the voltage comparator 20. The other input is connected to the sawtooth generator 26, the circuit for which is shown in FIG. 7.

The junction 54 is connected through a resistor 56 to a source of negative potential. Therefore, the input to the voltage comparator is held inoperative and is at a negative potential until one of the diodes 52X, 52Y, or 52Z, is made conductive whereby it can apply the output of the F/E circuit to which it is connected to the junction 54.

The diodes 52X, 52Y and 52Z, are normally held clamped to ground potential by means of the respective transistors 58X, 58Y, 58Z, which are normally conductive. They are rendered sequentially nonconductive by the count outputs of the three count counter 46. These outputs are respectively applied to the bases of these transistors. The transistors respectively have their collectors connected to the anodes of the respective diodes and all of their bases are connected to ground.

The circuit for multiplying the contents of the velocity counter by a scaling factor $2^k$ is also shown in FIG. 4. This circuit includes a shift register 60 with the facility for enabling the selection of three outputs, which are to be the respective scaling factors for the X, Y and Z counts in the velocity counter 24 shown in FIG. 2. These three outputs are applied to three AND gates respectively 62X, 62Y and 62Z. These three AND gates are each enabled in sequence by the outputs of the three count counter. The three AND gate outputs are collected by a NOR-gate 64. This output is inverted by the NAND-gate 66 and applied to the AND-gate 41 (see FIG. 3) of the velocity counter to set its least significant bit position for a particular axis as determined by the count of the three count counter and at a location in the counter as determined by the stage of the shift register which has been selected.

The shift register 60, has shift clock pulses applied from the same shift clock pulse source 68, as is used to shift the shift registers which comprise the iteration and velocity counters. The shift register receives an input from one or the other of two NAND gates respectively 70, 72. For linear operation, a signal from a linear-circular signal source enables NAND-gate 72 and through an inverter 74, disenables NAND-gate 70. A MARKER signal is applied to the NAND-gate 72 for entry into the shift register. This marker signal is derived from the least significant bit location of the iteration counter 16 and is introduced into the shift register.

When circular interpolation is used, the linear $\sqrt{\text{circular}}$ signal being low, the NAND-gate 70 is enabled and the NAND-gate 72 is not enabled. At this time the signal T4 is used in place of the least significant bit marker signal of the iteration counter. Its origin will be explained subsequently herein.

The shift register 60 operates as variable delay line generating a timing pulse indicative of the scaling factor to be used with the velocity counter and its output produces a signal connected to the the BINARY WEIGHT input of FIG. 3.

Figure 5:
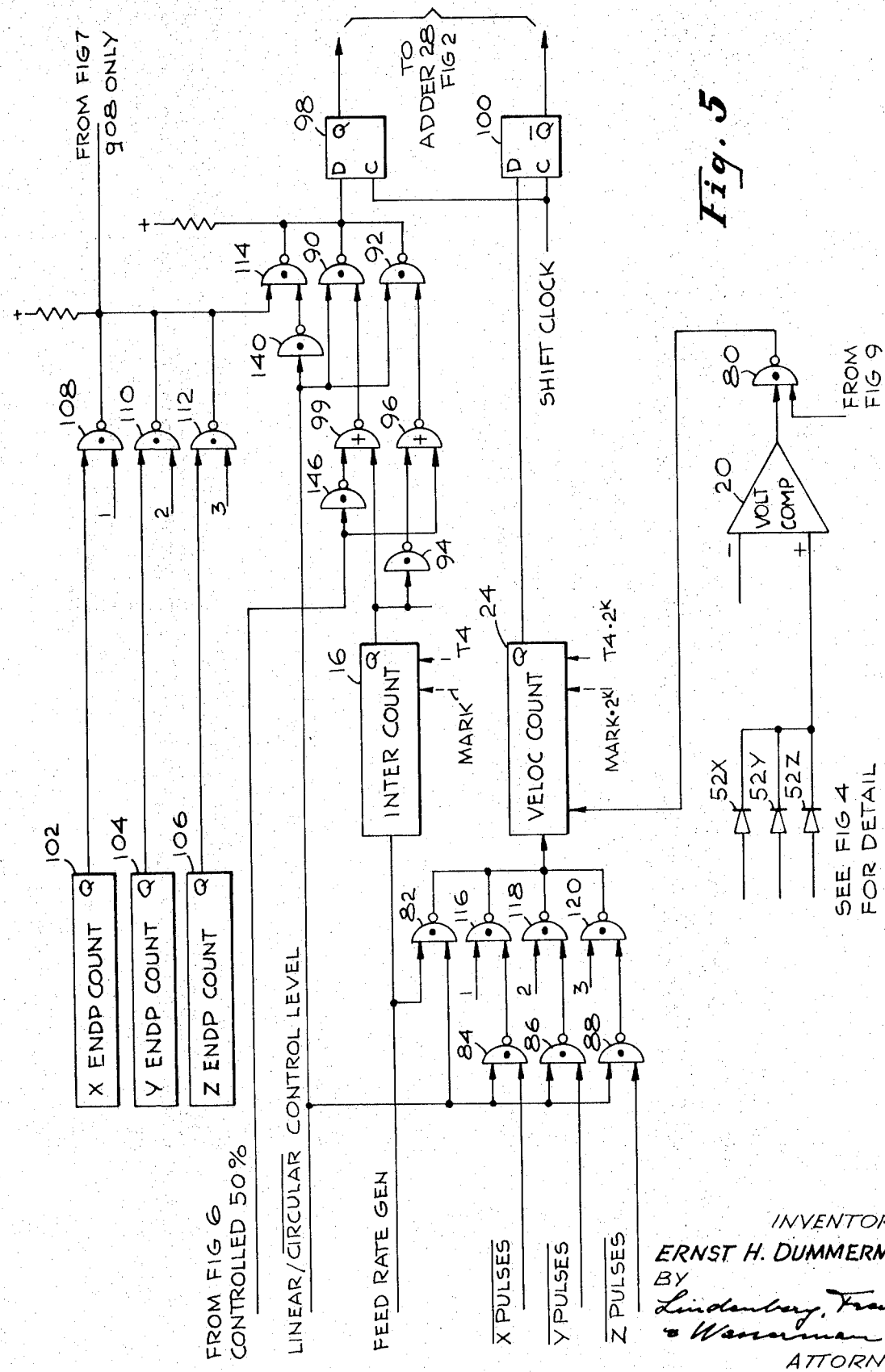
FIG. 5 shows the arrangement of the invention required to enable operation for both linear and circular modes.

FIG. 5 shows the remaining circuitry required for operating the invention in the linear as well as the circular modes. The iteration counter 16, velocity counter 24, and voltage comparator 20 are shown again and given the same reference numeral as in FIG. 2, since they perform the same functions as they did in FIG. 2. The output of the voltage comparator 20 is applied to a NAND-gate 80, which is enabled during the operation of the system by a circuit shown in FIG. 9. The output of the voltage comparator 20, whose pulse widths represent the amplitudes of the signals which are the output of the respective F/E circuits is applied to the velocity counter 24 through NAND-gate 80 to enable it to count feedrate generator pulses. For linear operation, a NAND-gate 82 is enabled in response to a linear $\sqrt{\text{circular}}$ control signal, whereby feedrate generator pulses, which are being applied to the iteration counter 16, are also applied to the velocity counter 24. The velocity counter can only count these pulses for the intervals of pulse widths provided by the output of the voltage comparator 20. This same operation was achieved with the NAND-gate 18 of FIG. 2.

When the linear $\sqrt{\text{circular}}$ control signal is high, not only does it enable NAND-gate 82 but it also disables NOR-gates 84, 86 and 88. It also enables NAND-gates 90 and 92, whereby the contents of the iteration counter can be applied to a flip-flop 98 from which they are entered into the adder 24.

The iteration counter contents are applied to an inverter 94, whose output is connected to a NOR-gate 96. NOR-gate 96 output is connected to the input of the NAND-gate 92. The output of NAND-gate 92 is applied to the flip-flop 98 to which shift clock pulses are applied from the shift clock source. FLip-flop 100 enters the count of the velocity counter into the adder.

The X, Y and Z end point counters respectively 102, 104, 106, are connected to the respective NAND-gates 108, 110, and 112. These NAND gates are enabled by the respective first, second and third outputs of the counter 46, shown in FIG. 4. The respective NAND-gates 108, 110, and 112, have their outputs connected to the NAND-gate 114. This NAND-gate 114, as well as NAND-gates 90 and 92, all have their outputs connected to the D input of the flip-flop 98.

NAND-gates 116, 118, and 120, when respectively enabled by the respective first, second, and third counts of the three count counter 46 shown in FIG. 4, can enter respectively $\bar{X}$ pulses, $\bar{Y}$ pulses, or $\bar{Z}$ pulses into the velocity counter 24, while it is enabled in response to the output of the voltage comparator.

LINEAR INTERPOLATION OPERATION

A description of the operation of the circuits shown in FIGS. 4 and 5, for linear modes is essentially the same as has been described for FIG. 2. The linear $\sqrt{\text{circular}}$ control level line is high whereby NOR-gates 84, 86 and 88 are blocked and NAND-gate 82 is enabled. Feedrate generator pulses are counted by the iteration counter and the velocity counter 24 can also count these pulses in the intervals during which the velocity counter 24 is enabled by the output of the voltage comparator 20. The F/E circuit inputs to the voltage comparator, for each axis is times by the output of the three count counter 46. Synchronism of the carry flip-flop output for each one of the F/E inputs is also achieved by the circuit arrangement shown in FIG. 4 which responds to the output of the three count counter.

During the acceleration interval, this should occur only while $\Delta i \geq v$ for all axes. Therefore, the three flip-flops respectively 32X, 32Y and 32Z in FIG. 4 store the three states of the carry flip-flop 30 until all three have been sampled. At this time, NAND-gate 42 operates to enable either the acceleration or the deceleration current source respectively 34 and 40, depending upon whether all the Q outputs of the flip-flops 32X, 32Y, and 32Z are high together or not. The three count counter 46 also enables the scaling factor $2^k$ to be introduced into the velocity counter for each axis, after a delay determined by the shift register 60. If, for any one axis, $\Delta i < v$, then the NAND-gate 42 enables the discharge current source to reduce the voltage on capacitor 36.

CIRCULAR INTERPOLATION OPERATION

In the circular interpolation mode, during acceleration, the system described operates in a similar way as explained for the linear mode, which is in accordance with the equation (3). In the circular mode the iteration counter is not used to determine the completion of a cycle, the $x$, $y$, and $z$ end point counters perform this function. Therefore, the iteration counter is used during acceleration and the end point counters are used during deceleration. Linear $\sqrt{\text{circular}}$ signal from the source 71 is low and therefore, referring to FIG. 4, NAND-gate 70 is enabled and NAND-gate 72 is not enabled. A clock signal T4 whose derivation will be shown subsequently herein, is used to insert the least significant bit marker signal in place of the least significant bit marker signal derived from the iteration counter. Therefore, the velocity counter operates with its least significant bit at the point $T4.2^k$ for comparison of $\Delta i \geq V$.

The acceleration ramp adjusts itself by comparing $\Delta i \geq V$ by the same closed loop as has been described for linear moves. For deceleration, in place of equation (3) we have the following, For deceleration equation (3) must be replaced by $$V_x/a \cdot V_x = \Delta x \quad (4)$$

This equation (4) is derived from (1) by replacing the time $t$ with $\Delta x/v_x$.

$V_x = a \cdot t = a \cdot \Delta x / Vx$ (FIG. 4)

Similar equations are written for the other axes. That is, equation (4) is multiplexed for all axes and assuming as the count in any of the end point counters, 102, 104, or 106, is less than $v$, then the deceleration operation is performed. In order to use the iteration counter for acceleration and the end point counters for deceleration, a second multiplexing circuit is required. Its circuitry is shown in FIG. 6. The third count output from counter 46 is applied to a second three count counter made of two flip-flops respectively 130, 132. The third count output of this counter is derived from the Q output of flip-flop 132 and is applied to the NAND-gate 134. Other inputs to the NAND gate are the third count output from counter 46, a 1 kilohertz signal from a 1 kilohertz source shown in FIG. 8 and a deceleration signal derived from the output of the NAND-gate 42 in FIG. 3.

The output of NAND-gate 134 drives a flip-flop 136 made of two NAND0-gates 136A and 136B, to its set state. The $\overline{Q}$ output of this flip-flop is used to set flip-flop 132 to its set state with its Q output high. Flip-flop 136 is reset from the output of a NOR-gate 138. This occurs either in the presence of a 7T clock signal, or in the presence of the linear$\sqrt{\text{circular}}$ signal. In the presence of an output from NOR-gate 138, the flip-flop 136 is transferred to its reset state with its $\overline{Q}$ output high.

The $\overline{Q}$ output signals of flip-flop 132 is applied in FIG. 5 to NAND-gates 90 and 92 as well as to an inverter 140. Inverter 140 output is applied to NAND-gate 114. This $\overline{Q}$ output of flip-flop 132 is designated as a linear$\sqrt{\text{circular}}$ control level output. It also is applied to the J input of flip-flop 98.

Considering again the operation of the invention in the circular mode, if a circular path is programmed, the linear $\sqrt{\text{circular}}$ signal source shown in FIG. 6 (142) provides a low output signal and therefore flip-flops 130 and 132 can respond to the clock pulses provided by the first divide by 3 counter 46. Otherwise, the $\overline{Q}$ output of flip-flop 100 remains high continuously, since flip-flop 100 is maintained in its reset state. The 7T signal is a timing pulse which occurs before motion starts to properly reset flip-flop 132.

Assuming, by way of illustration, that the first divide by 3 counter provides an output every 3 milliseconds, the second divide by 3 counter, consisting of flip-flops 130 and 132 has a 9 millisecond cycle time. As a result, the linear$\sqrt{\text{circular}}$ control level line, which is the output of flip-flop 132, is for 6 milliseconds and is low for 3 milliseconds. In FIG. 5, the linear $\sqrt{\text{circular}}$ control level line being high for 6 milliseconds enables NAND-gate 82 to feed feedrate pulses to the velocity counter 24 for this interval and disenables NOR-gates 84, 86 and 88. Also NAND-gate 114 is disabled thus blocking any of the end point counter count outputs from being applied to the adder, and NAND-gate 90 and 92 are enabled.

As a result of the linear $\sqrt{\text{circular}}$ control level line being high, it will be seen that for the 6 microseconds the iteration counter count and the velocity counter count are compared by the adder.

During the following 3 microseconds, after the 6 microseconds during which $\overline{Q}$ output of flip-flop 132 is high, the $\overline{Q}$ output will be low. This blocks NAND-gate 82 and enables the velocity counter to count $x$ contour pulses, then $y$ contour pulses, then $z$ contour pulses, during the respective first, second and third counts of the three count counter 46. The velocity counter is enabled over the duration of the width of a pulse, within each count interval, which is generated by the voltage comparator 20. The amplitude of the respective outputs of the F/E circuits respectively 22X, 22Y, and 22Z are applied to the voltage comparator during the respective first, second and third counts of counter 46, in the manner described in connection with FIG. 4.

NAND-gates 108, 110 and 112 are also successively enabled in response to the first, second and third count outputs of counter 46 with the result that for each one of the successive counts of counter 46, amounting to a 1 millisecond each, the three counter counts are being compared successively to the X, Y, and Z end point counter counts by the adder circuit.

The foregoing operation provides that during the acceleration mode of the system the iteration counter count is compared with the velocity counter count and operates in the same manner as was described previously for linear mode of operation. However, since the end point counters 102, 104, and 106 are counting towards 0, one of their counts will eventually indicate that the distance to end point is less than the contents of the velocity counter 20. Now considering the NAND-gate 134 on FIG. 6, at this moment the output of the NAND-gate 42 which is applied to NAND-gate 134 goes high, a 1 kilohertz signal is received, the Q output of flip-flop 132 is high, and the third count output is received from the three count counter 46. As a result NAND-gate 134 drives flip-flop 136 to its set state. The $\overline{Q}$ output of flip-flop 136 goes high thereby latching flip-flop 132 to its set state with its Q output high. As a result, the linear $\sqrt{\text{circular}}$ control level output of flip-flop 132 is kept low. As a result, referring to FIG. 5, NAND-gates 90 and 92 are disabled and NAND-gate 114 is enabled. Therefore, the outputs of the end point counter 102, 104 and 106 will be compared with the output of the velocity counter 20 every 3 milliseconds instead of every 9 milliseconds. The deceleration ramp performance is in accordance with equation (4) and deceleration mode then follows.

It was previously stated that for the acceleration mode of operation the iteration counter is used as an up counter and for the linear deceleration mode of operation the iteration counter is used as a down counter. Regarding FIG. 6, the function of flip-flop 144 is to select either the Q output of the iteration counter 16 which is the up counter output, or the $\overline{Q}$ output which is the down counter output.

It should be noted that the iteration counter 16 and the velocity counter 24 are both recirculating shift registers. The iteration counter is incremented 1 bit for every feedrate generator pulse it receives until it overflows. The Q output of the iteration counter therefore looks like an up counter whereas the $\overline{Q}$ output (1's complement of Q) looks like a down counter.

It is usual in the machine tool numerical control field to program acceleration with a code designated as a $g08$ code and deceleration with a code designated as a $g09$ code, and both acceleration and deceleration with both codes $g08$, $g09$. If a rapid code designated as $f00$ is programmed, it automatically causes a $g08$ and $g09$ to be activated also. FIG. 7, which will be described later, shows how the codes are separated.

If only a $g08$ code is programmed, this is applied in its inverted state to the $P_k$ input of the flip-flop 144 to maintain it in its reset state with its Q output low. Also, this signal is applied to the junction of the three NAND gates respectively 108, 110 and 112 shown on FIG. 4 which effectively prevents the output of the X, Y and Z end point counters from being applied to the adder. It should be further noted that the end point counters respectively 102, 104 and 106 are also 25 bit shift registers preset to a count representing the incremental distance and are counted down toward zero. Their Q outputs therefore look like down counters. The iteration counter remains connected as an up counter of the complete move. Acceleration takes place until full velocity is reached.

If only a $g09$ code is programmed, flip-flop 144 is held set by the $\overline{g09}$ input. The Q output of flip-flop 144 is high. This output is designated as the controlled 50 percent output.

Referring now to FIG. 5, the controlled 50 percent is applied to an inverter 146, the output of which is applied to a NOR-gate 148. The controlled 50 percent line is also applied to the NOR-gate 96.

When the controlled 50 percent line is low then NOR-gate 99 is blocked and NOR-gate 96 is open whereby the Q output of the iteration counter can be applied to the flip-flop 98 and thereafter is input A to the adder. When the control 50 percent line is high, then NOR-gate 96 is blocked and NOR-gate 99 is enabled. As a result, the Q output of the iteration counter is inverted by NOR-GATE 99 so that the signal is applied to the NAND-gate 90 constituting the 1's complement of the contents of the iteration counter, whereby the iteration counter output, as far as the adder 28 is concerned looks like the output of a down counter.

In the event of the g08 and g09 codes being present simultaneously, no inputs will be applied to the $P_jP_k$ terminals of the flip-flop 144 which is then enabled to respond to its set and reset inputs. The set input of the flip-flop is connected to the most significant bit position of the iteration counter 16. When the iteration counter most significant bit position becomes set, it has reached its 50 percent iteration point and thereafter, a deceleration ramp may occur. A repetitive timing signal T1 is applied to the clock input of flip-flop 144 to transfer the content of the most significant bit of the iteration counter into flip-flop 144 at 6 microsecond intervals. Therefore, the controlled 50 percent line will be low until the 50 percent point of the iteration counter is reached. Above the 50 percent count, the controlled 50 percent line is high. Therefore, the iteration counter is used as an upcounter until the 50 percent point is reached; thereafter the iteration counter is used as a down counter.

FIG. 7 illustrates the logic employed for separating acceleration/deceleration codes. The presence of a transfer code signal, from a transfer code signal source 150, flip-flops 152 and 154 are enabled to input either or both $\overline{g08}$ and $\overline{g09}$ signals respectively from the $\overline{g08}$ signal source 156 and the $g09$ signal source 158. The Q outputs of the flip-flops 152 and 154 are respectively applied to NAND-gates 160 and 162. These NAND gates are enabled in the presence of an output from a NAND-gate 164. NAND-gate 164 is biased to apply an enabling signal to NAND-gates 160 and 162. In the event however that a rapid traverse is desired, a rapid traverse signal source 166 disenables NAND-gate 164 whereby the machine tool travels in a rapid mode and acceleration and deceleration are performed without the use of the g08 and g09 codes. Also, an inhibit signal source 168 is provided for inhibiting acceleration and deceleration for a desired interval.

The output from NAND-gate 160 is applied to a NAND-GATE gate 170, whose output is a $\overline{g08}$ only signal applied to the $P_k$ terminal of flip-flop 144 in FIG. 6. The output of NAND-gate 160 is also applied to a NAND-gate 172 and to a NOR-gate 174. The output of NAND-gate 162 is applied to NAND-gate 172, to a NAND-gate 176 and to the NOR-gate 174. NAND-gate gate 176 output is the $\overline{g09}$ only signal applied to the $P_j$ terminal of flip-flop 144 shown in FIG. 6. In the presence of both $\overline{g08}$ and $\overline{g09}$ signals, NAND-gate 172 provides a low output which inhibits NAND-gates 170 and 176. In the absence of outputs from NAND-gates 160 and 162, a NOR-gate 178 provides a signal designated as $\overline{\text{neither}}$. This signal holds reset the storage flip-flop 32 in FIG. 2 or the storage flip-flops 32X, 32Y, and 32Z shown in FIG. 4. If a jog mode of operation is desired a signal from the jog mode signal source 180 is applied to the NOR-gate 178 which serves to set the storage flip-flops so that jog mode operation can occur.

FIG 8 is a block schematic diagram of the clock signal source, sawtooth generator and sample signal source. These signals are derived from an oscillator 182, which, by way of example may be 10 kHz. Its output is applied to a NAND-gate 184 and to a 10 binary coded decimal counter 186. The 10th output count of the counter 186 enables the NAND-gate 184 to apply a 1 kHz. output to an inverter 188, and to a NOR-gate 190. The 1 kHz. output of NOR-gate 188 is used in FIGS. 3 and 5. The output of NAND-gate 190 is a 1 kHz. sample signal which is applied to FIGS. 3 and 6 for enabling the storage flip-flops to sample the contents of the carry flip-flops. The 1 kHz. output of the counter 186 is employed to drive a multivibrator 192. This multivibrator generates a 10 microsecond pulse. This output is applied to an inverter 194 and acts as the $\overline{\text{clear}}$ signal which is applied to the velocity counters to cause them to be reset after their contents have been entered into the adder.

The output of the multivibrator 192 causes a transistor 195 to become conductive of 10 microseconds, thereby discharging a capacitor 196. The capacitor 196, during the intervals wherein transistor 194 is not conductive, charges up from a constant current source 198 to produce a sawtooth voltage at its output. This sawtooth voltage is applied to the input to the voltage comparators shown in FIGS. 3 and 4.

Figure 9:
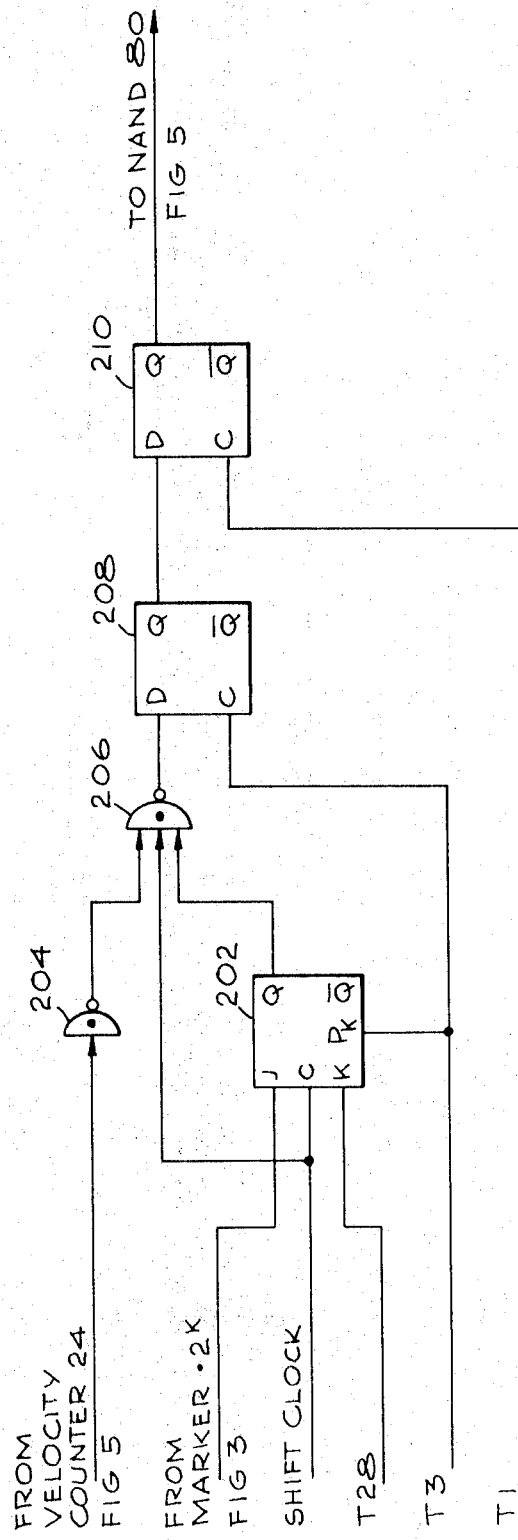
FIG. 9 is a block schematic diagram illustrating how overflow protection may be provided for a velocity counter.

FIG. 9 is a block schematic diagram of a circuit arrangement to prevent velocity counter overflow. Under normal conditions the velocity counter 24 does not overflow. However, if a deceleration is called for and the distance to the end point is not far enough to allow for a proper deceleration slope then the velocity counter does overflow. Equation (3) is already unbalanced at the moment that such a deceleration is called for. In other words, $\Delta i$ smaller than V is already true. The iteration counter with a g09 code only operates in a down count mode starting out with all "1's" above and including the marker bit. The velocity counter 24 is monitored and input pulses thereto are cut off if the contents reach all 1's above the marker $2^k$ bit.

In operation, the contents of the iteration counter 16 are slightly larger than the contents of the velocity counter 24 at the beginning of the g09 block. However, the iteration counter counts down whereas the velocity counter remains at all "1's." After $2^k$ pulses into the iteration counter, $\Delta i$ becomes less than V. To evaluate the elapsed time to reach this point, assuming that $K=9$, $2^k=512$, $f=166$ kHz., $t=512/166$ or approximately 3.1 milliseconds. In other words, after this particular information block was started processing it would take 3.1 milliseconds before deceleration would start. At that time deceleration would occur at the rate enabled by the current source 40 which was assumed was approximately a 150 millisecond rate.

During this deceleration, the pulses offered to the velocity counter 24 would steadily decrease the velocity counter count from all 1's until at some point it reaches At this moment, equation (3) is balanced again and deceleration would follow the regular slope.

Figure 10:
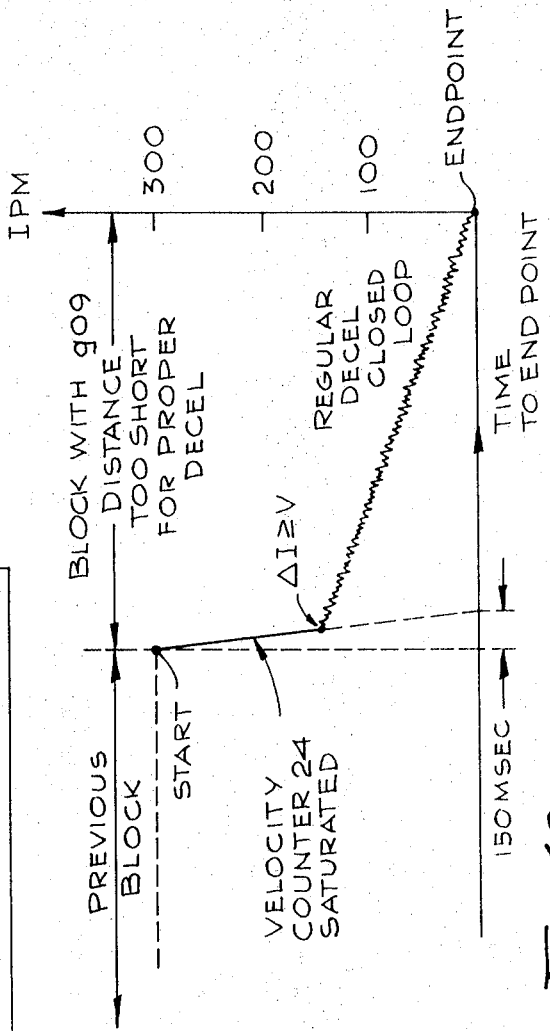
FIG. 10 is a diagram illustrating velocity versus time for the circuit arrangement of FIG. 9.

FIG. 10 shows a curve 200 which illustrates the operation of the system. When the g09 mode operation is called for, since the distance is too short to enable the regular closed loop deceleration operation, there is a region within which the velocity counter is saturated, or is all 1's, within which deceleration occurs at the maximum rate possible. This continues to occur until equation (3) is balanced at which point the regular deceleration closed loop operation will take over until the end point.

The circuit for performing this, as shown in FIG. 9, includes a flip-flop 202 which is driven to its set state upon receiving the output of the inverter 66 of FIG. 4. This is the marker $2^k$ qualifying line. Data from the velocity counter 24, is inverted by inverter 204 and is applied to the NAND-gate 206, together with a shift clock input and the Q output of the flip-flop 208. A timing pulse $\overline{T3}$ is used to reset flip-flop 202 as well as the flip-flop 208.

If the velocity counter has reached all 1's above the marker $2^k$, then NAND-gate 206 output remains high and the Q output of the flip-flop 208 remains low.

With the timing pulse T1, the state of flip-flop 208 is clocked into a flip-flop 210. The Q output of the flip-flop 210 is applied to the NAND-gate 80 in FIG. 5 causing its output to go high whereby the velocity counter is disabled for further counting.

The $\overline{T3}$ clock pulse continuously samples the state of the velocity counter by resetting both flip-flops 202 and 208. However, if the velocity counter is still in its overflow state the flip-flop 206 remains reset. The T28 pulse occurs at the end of an operating cycle and resets flip-flop 202. Should the Q output of flip-flop 208 not be present at the time a T1 pulse occurs, flip-flop 210 is reset.

FIG. 11 is a block schematic arrangement for performing slide, stop and jog accel/decel operation with the system previously described herein.

To interrupt the motion of the machine tool at any one point in time, it is necessary to decelerate first to reduce the velocity to a point where cutoff can be performed. Since at the time that a cutoff is signaled, the iteration counter or the down counters, as the case may be, have not reached their deceleration points, no comparison for performing deceleration can be achieved.

FIG. 11 duplicates the arrangement of the current sources 34 and 40 and their connections to the capacitor 36 which, in turn, is connected to the operational amplifier 38. The operational amplifier connects back to the voltage controlled oscillator 10. This is the arrangement shown previously. In addition, for purposes of slide stop and jog, there are provided a charge current source 220, a discharge current source 222, which are connected to the capacitor 36 in the same manner as the respective sources 34 and 40. The output of the operational amplifier 38 is applied to a voltage comparator 224 to be compared in amplitude with a 1 volt bias source.

Under normal running conditions, as indicated before, current source 34 is turned on whereas current sources 40, 220 and 222 are turned off. Now assuming that the jog button 226 is not pressed, the $\overline{\text{jog}}$ button source is high. Upon operating the slide stop button 228 its output is high. This causes the output of NAND 230 to go low. Its output disables NAND-gate 232 and causes the flip-flop, comprised of cross connected NAND-gates 234A and 234B, to be set to the state with its $\overline{Q}$ output high. This $\overline{Q}$ output is applied to a NAND-gate 236, whose other input is received from an inverter 238. Since the input to the inverter is low, NAND-gate 236 is now enabled. Its output goes low and is inverted by an inverter 240 whereby discharge current source 222 is enabled simultaneously therewith, since NAND-gate 232 was enabled, its output, which is low, is applied through NAND-gate 232 to an inverter 242. The output of the inverter 242 is low. The output of the inverter 242 disables the charge current source 220.

The $\overline{Q}$ output of flip-flop 234A/234B, which is now high, is applied to the NOR-gate 44 whereby its output will inactivate the charge current source 34.

From the foregoing, it will be seen that the capacitor 36 is discharged at a rate as rapid as is desired by the setting of the discharge current source 222. In response to this discharge, the output of the operational amplifier 38 will drop below the 1 volt comparison level of the voltage comparator 224. The result is a safe stop signal in response to which the machine tool is enabled to slide to a stop.

To resume motion, the slide stop button is grounded, in response to which the output of NAND-gate 230 goes high. This causes the output of inverter 240 to go low inactivating discharge current source 222. The output of NAND-gate 232 is low, as a result of which inverter 242 output is high. This causes a charge current source 220 to become activated. The capacitor 36 is then charged at the rate determined by the amount of current selected for current source 220. Flip-flop 234A/234B remains with its Q output high holding off current source 34.

The slide stop operation can be repeated as often as desired. The described deceleration/acceleration will repeat.

If towards the end of a move, the comparison $\Delta i \geq V$ becomes false, then deceleration as described immediately above should take place. If $\Delta < V$, then, in FIG. 4, the output of NAND-gate 42 goes high whereby the discharge current source 40 is enabled. The output of NAND-gate 42 is also applied to an inverter 244 which causes flip-flop 234A/234B to be set with its $\overline{Q}$ output low. This results in the outputs of inverters 240 and 242 going low whereby the respective charge current source 220 and discharge current source 222 are disabled. Deceleration towards the end point thereafter proceeds in the manner previously described using current sources 34 and 40 as described initially.

It should be noted that the slide stop operation can be called for even if the system is already in an automatic deceleration mode towards the end of a move. AND-gate 230 output going low in response to the operation of the slide stop button 228, resets flip-flop 234A/234B with its $\overline{Q}$ output high. This overrides any input from the inverter 244. Thereafter the operation, as previously described for the slide stop, occurs.

It should be further noted that the output from NAND-gate 42 may still be present even during the slide stop operation. Therefore the comparison of $\Delta i \geq V$ is maintained, and if source 222 cannot discharge the capacitor and thus reduce the frequency of the feedrate generator fast enough to balance this equation, the discharge current source 40 is activated and helps discharging capacitor 36.

Jog operation starts out with a 0 velocity and with both inputs to the AND-gate 230 high. To jog an axis, the input from the jog button source is grounded causing an operation similar to the one described for slide stop. Being in the jog mode generally causes the input to the NOR-gate 178 shown in FIG. 7, to be high as a result of which its output, designated as $\overline{\text{neither}}$ is low. This low output, as previously described, is connected to the overflow storage flip-flops 32, shown in FIGS. 2 and 4, and serves to keep them set with their Q outputs high. This prevents deceleration since it is also used to disable the discharge current source, as shown in FIG. 11. Therefore, the output of inverter 244 remains high keeping flip-flop 234A/234B in its reset state with its $\overline{Q}$ output high. As a result the charge current source 34 is also disabled. In other words, both current sources 34 and 40 are maintained disabled for jog operations.

During acceleration the voltage at the output of the operational amplifier 38 rises and the output of the voltage comparator 224 goes low. To terminate the jog operation, the jog button is released, disabling current source 220 and deceleration takes place in the manner described previously for slide stop. The jog pulses are cut off when the safe stop detector with its output goes high. Therefore, the jog button 220 also sets a latch flip-flop (not shown) which is reset if the button is released and if the safe stop terminal goes high again.

The system described herein allows acceleration and deceleration of a numerical control machine tool system in accordance with the acceleration constants or deceleration constants of the individual axes. Programming of acceleration, deceleration or both as well as jogging can take place in any linear or circular block.

With g08 program the system accelerates at the selected acceleration constant value until it reaches full velocity. With a g09 program the system will move with the program velocity until it reaches a point at which it can begin deceleration towards the end point at the selected deceleration constant value. Deceleration point and slope are computed automatically. If the move calling for g09 is too short to allow for proper deceleration, then a fast deceleration takes place until the system can decelerate in accordance with the deceleration constant to the end point.

Similarly, moves containing g08 and g09 will not reach full velocity if the program distance is too short. This system accelerates to the 50 percent point and decelerates. No special hardware is necessary since this behavior is incorporated in the comparison technique.

Circuits for generating timing and shift register pulses are well known and thus will not be described. For example, a 10 mHz. crystal oscillator has its output divided by 30 to provide 30 pulses designated from T0 to T29. Individual pulses may be used where required, i.e., $T_4$, $T_{28}$, etc., as described herein and the pulses $T_4$ to $T_{29}$ may be used as shift register pulses.

There has been described herein a novel and useful system for automatically controlling the acceleration and deceleration of a numerically controlled machine tool.

The embodiments of the invention in which an exclusive property or privilege is claimed are defined as follows:

1. In a numerically controlled machine tool system of the type having a feedrate generator for generating a feedrate pulse wavetrain which is applied to drive an iteration counter which in response thereto provides a count to indicate elapsed time by its reciprocal count indicates time remaining to complete a commanded motion, and having rate multipliers for each axis for generating axis motion command pulse trains when driven by said feedrate pulse wavetrain, means for accelerating said machine tool to a predetermined desired maximum velocity with a constant acceleration and for decelerating said machine tool from said maximum velocity down to zero with a constant deceleration comprising:
  velocity counter means to which said feedrate pulse wavetrain is applied for converting an axis motion command pulse train into a count representing the frequency of said command pulse train divided by a constant,
  means for comparing the count in said iteration counter and the count in said velocity counter for producing an output indicative thereby, and
  control means responsive to the output of said means for comparing for controlling the frequency of the federate pulse wavetrain generated by said feedrate generator.

2. The invention in accordance with claim 1, wherein said control means operates to increase the frequency of the feedrate pulse wavetrain when the count of said iterative counter equals or exceeds the count of said velocity counter means, and operates to decrease the frequency of the feedrate pulse wavetrain when the count of the iteration counter is less than the count of said velocity counter means.

3. The invention in accordance with claim 1 wherein there is also included:
  means for determining when said iteration counter has counted to a predetermined count and in response thereto causing the complement of the count of said iteration counter to be applied to said means for comparing instead of the actual count.

4. The invention in accordance with claim 2, wherein said numerically controlled machine tool system has a circular interpolation capability and also includes:
  an end point down counter for each axis having a count therein indicative of the distance required to be moved by said machine tool to the end of a circular motion,
  means for applying the respective axis command pulse trains to each end point counter to cause it to count downward,
  means for generating a circular signal indicative of a circular interpolation being performed by said numerically controlled machine tool,
  means responsive to said circular signal for periodically applying to said means for comparing an end point down counter count instead of an iterative counter count,
  means responsive to the output of said means for comparing indicating the velocity counter count exceeds the end point counter count for thereafter applying to said means for comparing only the end point down counter count.

5. The invention in accordance with claim 1, wherein said means for determining the frequency of the feedrate generator pulse wavetrain generated by said feedrate generator includes a voltage controlled oscillator having its output connected to drive said feedrate generator, and wherein said system additionally includes:
  a capacitor connected to control said voltage controlled oscillator with the voltage thereacross,
  a constant current charging voltage source,
  a constant current discharging voltage source, and
  means for charging said capacitor with a voltage from said charging voltage source or discharging a voltage from said capacitor into said discharging voltage source responsive to the output of said means for comparing.

6. In a numerically controlled machine tool system of the type wherein a feedrate generator generates a feedrate pulse wavetrain which is applied to an iteration counter for measuring the number of iterations being performed by axis digital differential integrators to which the feedrate pulse wavetrain is also applied for generating and axis motion command pulse wavetrain, and improved acceleration and deceleration control system comprising means for periodically converting an axis motion command pulse wavetrain into a width-modulated pulse having its width proportional to the frequency of said motion command pulse train and inversely proportional to the acceleration or deceleration desired comprising:
  a velocity counter,
  means for applying said feedrate pulse wavetrain to said velocity counter,
  means for applying said width-modulated pulse to said velocity counter for enabling said velocity counter to count only over an interval measured by the width of said pulse,
  means for scaling the count in said velocity counter to the count in said iteration counter,
  means for comparing the iteration counter count with the scaled velocity counter count and providing an output indicative of equality of counts or of which count is larger,
  means for determining the frequency of the feedrate generator pulse wavetrain generated by the feedrate generator,
  means responsive to said means for comparing output indicating that the iteration counter count is equal to or larger than said scaled count of said velocity counter for controlling said means for determining to increase towards a predetermined maximum the frequency of the feedrate generator pulse wavetrain,
  means responsive to said means for comparing output indicating that the iteration counter count is less than said velocity counter count for reducing towards a predetermined minimum the frequency of said feedrate generator pulse wavetrain.

7. The invention in accordance with claim 6, wherein there is also included:
  means for determining when said iteration counter has counted to a predetermined count and in response thereto causing the complement of the count of said iteration counter to be applied to said means for comparing instead of the actual count.

8. The invention in accordance with claim 7, wherein said numerically controlled machine tool system has a circular interpolation capability and also includes:
  an end point down counter for each axis having a count therein indicative of the distance required to be moved by said machine tool to the end of a circulate motion,
  means for applying the respective axis command pulse trains to each end point counter to cause it to count downward,
  means for generating a circular signal indicative of a circular interpolation being performed by said numerically controlled machine tool,
  means responsive to said circular signal for periodically applying to said means for comparing and end point down counter count instead of an iteration counter count,
  means responsive to the output of said means for comparing indicating that the velocity counter count exceeds the end point counter count for thereafter applying to said means for comparing only the end point down counter count.

9. IN a numerically controlled machine toll system of the type having a plurality of axes, a feedrate generator for generating a feedrate pulse wavetrain which is applied to a digital differential integrator for each axis for generating a command pulse wavetrain for each axis, and an iteration counter which receives feedrate pulses for counting the number of iterations being performed by the axis digital differential integrators,
  means for increasing the velocity of said machine tool up to a desired maximum velocity at a constant rate of acceleration and for decelerating from said maximum velocity to zero velocity at a constant rate of deceleration comprising:
  a means for each axis to which a command pulse wavetrain is applied for producing an analog signal having an amplitude representative of the frequency of said command pulse wavetrain,
  means for converting an analog signal into a pulse having a width representative of the amplitude thereof,
  first counter means for successively enabling the analog signal of each axis to be applied to said means for converting,
  a velocity counter, means for applying feedrate generator pulses to said velocity counter, means for applying pulses to said velocity counter from said means for converting to enable said velocity counter to count only during the interval of one of said pulses, means synchronized by said first counter means for scaling up the count in said velocity counter for each axis, means for comparing the scaled up count in said velocity counter for each axis with the count in said iteration counter and producing for each axis an acceleration signal whenever said iteration count equals or exceeds said velocity counter count, means for each axis for storing said acceleration signal and means for detecting when all of said means for storing contains acceleration signals for increasing the frequency of the feedrate generator wavetrain and for detecting when less than all of said means for storing contains acceleration signals for decreasing the frequency of the feedrate generator wavetrain.

10. The invention in accordance with claim 9, wherein said numerically controlled machine tool system has a circular interpolation capability and also includes:

and end point down counter for each axis having a count therein indicative of the distance required to be moved by said machine tool for circular interpolation, means for applying the respective axis command pulse trains to each end point counter to cause it to count downward, means for generating a circular signal indicative of a circular interpolation being performed by said numerically controlled machine tool, means responsive to said circular signal for establishing alternate intervals during which said end point counter counts are applied synchronized by said first counter to said means for comparing in place of said iteration counter counts, and means responsive to said means for detecting during an interval of comparing end point counter counts when less than all of said means for storing contains an acceleration signal for thereafter applying to said means for comparing only said end point counter counts.

11. The invention in accordance with claim 10, wherein there is also included:

means for detecting when said iteration counter has counted to a predetermined count, and in response thereto causing the complement of the count of said iteration counter to be applied to said means for comparing instead of the actual count.

12. The invention in accordance with claim 9, wherein said means for detecting when all of said means for storing contains an acceleration signal for increasing the frequency of the feedrate generator wavetrain for detecting when less than all of said means contains an acceleration signal for decreasing the frequency of the feedrate generator wavetrain, includes:

a voltage controlled oscillator connected to drive said feedrate generator, a capacitor connected to control said voltage controlled oscillator with the voltage thereacross, a charging voltage source, a discharging voltage source, means for charging up said capacitor form said charging voltage source responsive to said means for indicating that all of said means for storing contains an acceleration signal, and means for discharging said capacitor from said discharging voltage source responsive to said means foe detecting indicating that not all of said means for storing contains an acceleration signal.

13. The invention in accordance with claim 9, wherein there is included manually operable means, and wherein said charging voltage source and said discharging voltage source include means for enabling the application of charging voltage and discharging voltage to said capacitor responsive to operation of said manually operable means.

* * * * *

UNITED STATES PATENT OFFICE
CERTIFICATE OF CORRECTION

Patent No. 3,617,715  Dated November 2, 1971

Inventor(s) Ernst Dummermuth

It is certified that error appears in the above-identified patent and that said Letters Patent are hereby corrected as shown below:

In the grant (only), column 14, line 34,

Insert -- $\Delta i \geq V.$ -- after "reaches".

Signed and sealed this 27th day of March 1973.

(SEAL)
Attest:

EDWARD M. FLETCHER, JR.  ROBERT GOTTSCHALK
Attesting Officer  Commissioner of Patents